(12) United States Patent
Palmas et al.

(10) Patent No.: US 7,744,744 B1
(45) Date of Patent: Jun. 29, 2010

(54) CONVERTED FCC BUBBLING BED REGENERATOR

(75) Inventors: Paolo Palmas, Des Plaines, IL (US); Frank S. Rosser, Jr., LaGrange Park, IL (US); Patrick D. Walker, Park Ridge, IL (US)

(73) Assignee: UOP LLC, Des Plaines, IL (US)

( * ) Notice: Subject to any disclaimer, the term of this patent is extended or adjusted under 35 U.S.C. 154(b) by 1205 days.

(21) Appl. No.: 11/322,755

(22) Filed: Dec. 30, 2005

(51) Int. Cl.
- *C10G 11/18* (2006.01)
- *F27B 15/08* (2006.01)
- *F27B 15/09* (2006.01)
- *B01J 38/36* (2006.01)

(52) U.S. Cl. .................. 208/113; 422/144; 502/42; 502/43

(58) Field of Classification Search .............. 208/113; 422/144; 502/40, 41, 42, 43, 44
See application file for complete search history.

(56) References Cited

U.S. PATENT DOCUMENTS

| | | | | |
|---|---|---|---|---|
| 3,893,812 A | * | 7/1975 | Conner et al. ............... 422/144 |
| 4,035,284 A | * | 7/1977 | Gross et al. ............ 208/120.01 |
| 4,051,069 A | * | 9/1977 | Bunn et al. .................. 502/40 |
| 4,197,189 A | * | 4/1980 | Thompson et al. .......... 208/164 |
| 4,272,402 A | | 6/1981 | Mayes ........................ 252/417 |
| 4,430,300 A | * | 2/1984 | Vickers ...................... 422/109 |
| 4,917,790 A | * | 4/1990 | Owen ......................... 208/113 |
| 4,965,232 A | * | 10/1990 | Mauleon et al. ............... 502/43 |
| 5,158,919 A | | 10/1992 | Haddad et al. ................ 502/44 |

* cited by examiner

*Primary Examiner*—Walter D Griffin
*Assistant Examiner*—Renee Robinson
(74) *Attorney, Agent, or Firm*—James C Paschall

(57) ABSTRACT

An apparatus and process for regenerating cracking catalyst may include a regenerator, a distributor penetrating the bottom of the regenerator, a spent catalyst conduit, a return standpipe, and a recirculating standpipe, wherein the return standpipe and the recirculating standpipe are connected to the upper half of the regenerator. An apparatus for regenerating cracking catalyst may include a spent catalyst standpipe and a recirculation standpipe positioned on an inner side of the regenerator vessel.

26 Claims, 2 Drawing Sheets

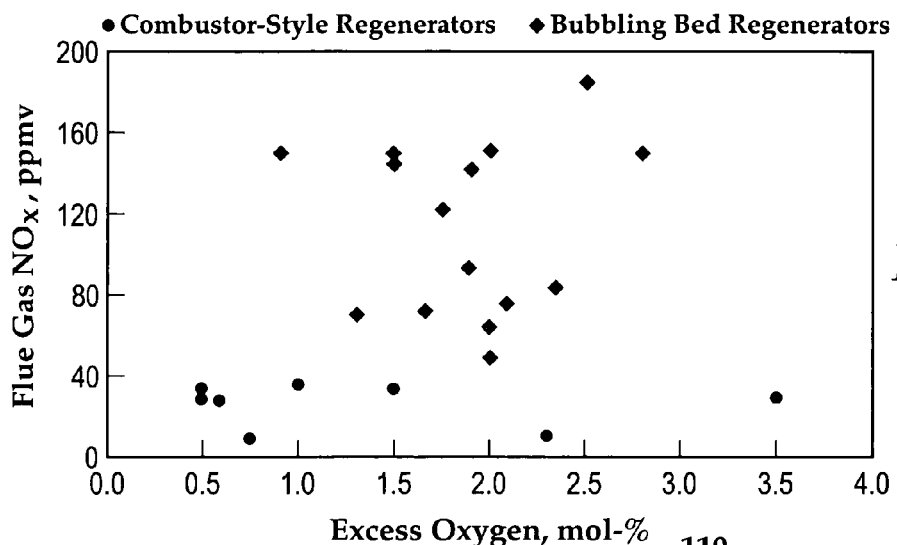
Fig.1
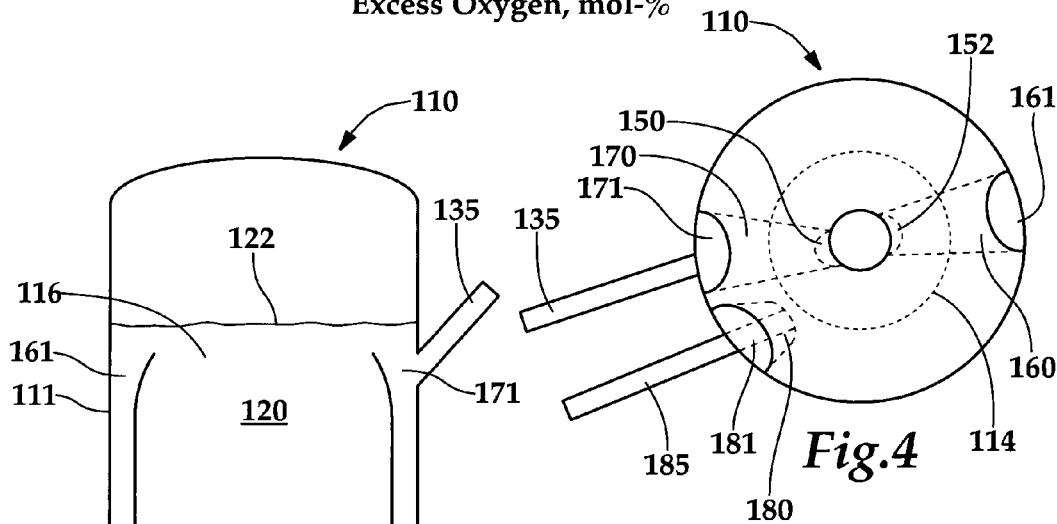
Fig.3
Fig.4
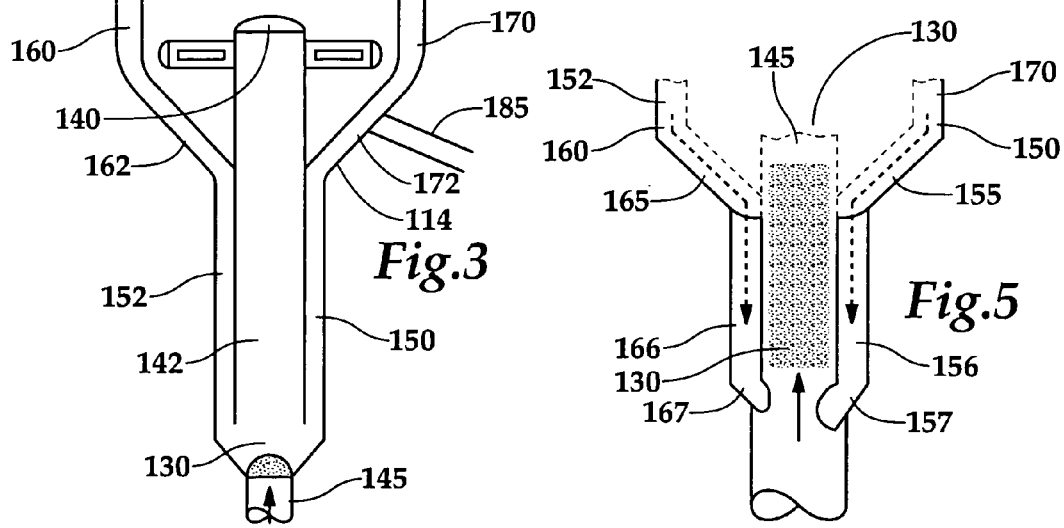
Fig.5

CONVERTED FCC BUBBLING BED REGENERATOR

BACKGROUND OF THE INVENTION

This invention is directed to a process and an apparatus for regenerating catalyst and for lowering nitrogen oxide production.

DESCRIPTION OF THE PRIOR ART

Fluid catalytic cracking (FCC) is a catalytic conversion process of heavy hydrocarbons into lighter hydrocarbons accomplished by contacting the heavy hydrocarbons in a fluidized reaction mixing zone with a catalyst composed of finely divided particulate material. Most FCC units now use zeolite-containing catalyst having high activity and selectivity.

The basic components of the FCC process include a riser, a reactor vessel for disengaging spent catalyst from product vapors, a regenerator and a catalyst stripper. In the riser, the hydrocarbon feed contacts the catalyst and is cracked into a product stream containing lighter hydrocarbons. In the riser, regenerated catalyst and the hydrocarbon feed are transported upwardly by the expansion of the gases that result from the vaporization of the hydrocarbons, and other fluidizing mediums, upon contact with the hot catalyst. Upon contact with the catalyst the hydrocarbon feed is cracked into lower molecular weight products. Coke accumulates on the catalyst particles as a result of the cracking reaction and the catalyst is then referred to as "spent catalyst."

The spent catalyst particles must be regenerated before they can catalytically crack more hydrocarbons. Regeneration occurs by complete oxidation of the carbonaceous deposits to carbon oxides and water. The spent catalyst is introduced into a fluidized bed at the base of the regenerator, and oxygen-containing combustion air is passed upwardly through the bed. After regeneration, the regenerated catalyst is returned to the reactor riser.

Nitrogen oxide (NOx) is usually present in regenerator flue gases but should be minimized because of environmental concerns. NOx includes NO and $NO_2$. In an FCC regenerator, NOx is produced almost entirely by oxidation of nitrogen compounds originating in the FCC feedstock and accumulating in the coked catalyst. At FCC regenerator operating conditions, there is negligible NOx production associated with oxidation of $N_2$ from the combustion air. Production of NOx is undesirable because it reacts with volatile organic chemicals and sunlight to form ozone. Environmental agencies have set limits of around 20 ppmv for NOx emissions.

Bubbling bed and combustor style regenerators may utilize a CO promoter comprising platinum for burning the coke to $CO_2$. The CO promoter decreases CO emissions but increases NOx emissions in the regenerator flue gas.

The two most common types of FCC regenerators in use today are a bubbling bed regenerator and a combustor style regenerator. A bubbling bed regenerator has a dense fluidized bed of catalyst. Fluidizing combustion gas forms bubbles that ascend through a discernible top surface of a dense catalyst bed. Only catalyst entrained in the gas exits the regenerator with the vapor. Cyclones above the dense bed to return the catalyst entrained in the gas to the catalyst bed. Typically the spent catalyst is introduced near the top of the bed and withdrawn near the bottom of the bed. The superficial velocity of the fluidizing combustion gas is typically less than 1.2 m/s (4 ft/s) and the density of the dense bed is typically greater than 480 kg/m$^3$ (30 lb/ft$^3$) depending on the characteristics of the catalyst. The mixture of catalyst and vapor is heterogeneous with pervasive vapor bypassing of catalyst. The temperature will increase in a typical bubbling bed regenerator by about 17° C. (about 30° F.) from the dense bed to the cyclone outlet. The flue gas leaving the bed may have an about 2 mol-% CO. This CO may require about 1 mol-% oxygen for combustion. Assuming the flue gas has 2 mol-% excess oxygen, there will likely be 3 mol-% oxygen at the surface of the bed and higher amounts below the surface. Excess oxygen is not desirable for low NOx operation.

The combustor style regenerator has a lower vessel that acts as a combustor that completely burns the coke to $CO_2$ with little or no CO promoter and with low excess oxygen. The lower part of the combustor is a highly backmixed fast fluidized bed. A portion of the hot regenerated catalyst is recirculated to the lower combustor to heat the incoming spent catalyst and to control the combustor density to the desired level. As the catalyst enters the combustor riser, the velocity is further increased and the two-phase mixture exits through a rough cut separator such as symmetrically downturned distributor arms.

U.S. Pat. No. 5,158,919 (Haddad et al.) and U.S. Pat. No. 4,272,402 (Mayes) teach a regenerator that draws off regenerated catalyst at the bottom of a fluidized bed and mixes a portion of the regenerated catalyst with spent catalyst withdrawn from the reactor. The regenerators of these two patents achieve a more environmentally acceptable flue gas. The recycle of regenerated catalyst back through the catalyst retains some of the process heat from regeneration for energy efficiency and further reduces the coke on the spent catalyst. However, withdrawing catalyst from the bottom of a bed may not provide enough time for the spent catalyst to be fully regenerated.

What is needed is a way to minimize NOx emissions while ensuring the catalyst is fully regenerated.

SUMMARY OF THE INVENTION

A fluidized catalytic cracking (FCC) process may include cracking the hydrocarbon feed in a riser with regenerated catalyst and forming a cracked product stream and spent catalyst, combining the regenerated catalyst and spent catalyst into a mixture in a mixing zone, transporting the mixture upwardly into a regenerator vessel having a dense bed, regenerating the spent catalyst into regenerated catalyst in the dense bed, withdrawing the regenerated catalyst from near the top of the dense bed, returning a first portion of the regenerated catalyst into the riser, and recirculating a second portion of the regenerated catalyst to the mixing zone.

In further aspects of the invention, the combustion gas, the regenerated catalyst, and the spent catalyst may be combined in a distributor below the regenerator. The regenerated catalyst may be withdrawn from a top third of the dense bed. Lift gas may be added into the distributor. Combustion gas may be added to the dense bed. The lift gas may comprise between about 10 wt-% and about 30 wt-% of the combustion gas.

In another aspect of the invention, a second portion of the catalyst returned to the riser may be greater than a first portion of the catalyst that may be recirculated. The second portion may be between 100 wt-% and about 300 wt-% greater than the first portion.

In another aspect of the invention, an apparatus for regenerating cracking catalyst may include a regenerator having a bottom and a side, wherein the side has an upper half, a distributor penetrating the bottom, a spent catalyst conduit, a return standpipe flowably connected between the upper half of the side and a riser, and a recirculating standpipe flowably connected between upper half of the side and the distributor.

In other aspects of the invention, combustion gas distributors having inlets penetrating the bottom of the regenerator. The distributor may have a distributor inlet and the combustion gas inlets may be located higher than the distributor inlet. The distributor may have a lift gas inlet. The return standpipe may have a fluidizing gas source. The return standpipe may have a larger diameter than the diameter of the recycle standpipe.

In still another aspect of the invention, an apparatus for regenerating cracking catalyst may include a generally cylindrical regenerator vessel having a lower portion, with an inner side, a bottom and a dense bed of catalyst contained therein, a distributor penetrating through the bottom and in fluid communication with the regenerator vessel, a spent catalyst standpipe positioned on the inner side and in fluid communication with the distributor, a recirculation standpipe positioned on the inner side and in fluid communication with the distributor, a spent catalyst conduit penetrating the lower portion and in fluid communication with the regenerator vessel, and a return catalyst conduit penetrating the lower portion and in fluid communication with the regenerator vessel.

The other aspects of the invention, the apparatus for regenerating cracking catalyst may further include a spent catalyst hopper in fluid communication with the spent catalyst standpipe, wherein the spent catalyst conduit is in fluid communication with the spent catalyst hopper. The apparatus for regenerating cracking catalyst may also include a recirculation hopper in fluid communication with the recirculation standpipe. The apparatus for regenerating cracking catalyst may also include a return catalyst hopper in fluid communication with the return catalyst conduit. The spent catalyst hopper may be positioned in a first location and the recirculation hopper may be positioned in a second location, wherein the first location and the second location are diametrically opposite in the regenerator vessel. The apparatus for regenerating cracking catalyst may further include an air distributor below and in fluid communication with the distributor.

BRIEF DESCRIPTION OF THE DRAWINGS

FIG. 1 is a chart comparing the NOx emissions of bubbling bed regenerators to the NOx emissions of combustor style regenerators as a function of excess oxygen.

FIG. 3 is a cross-sectional elevation view of a revamped bubbling bed regenerator with internal standpipes.

FIG. 4 is a cross-sectional top view of a revamped bubbling bed regenerator with internal standpipes.

FIG. 5 is a cross-sectional elevation view of a revamped bubbling bed regenerator with internal standpipes connected to an air distributor.

DETAILED DESCRIPTION OF THE INVENTION

Figure 2:
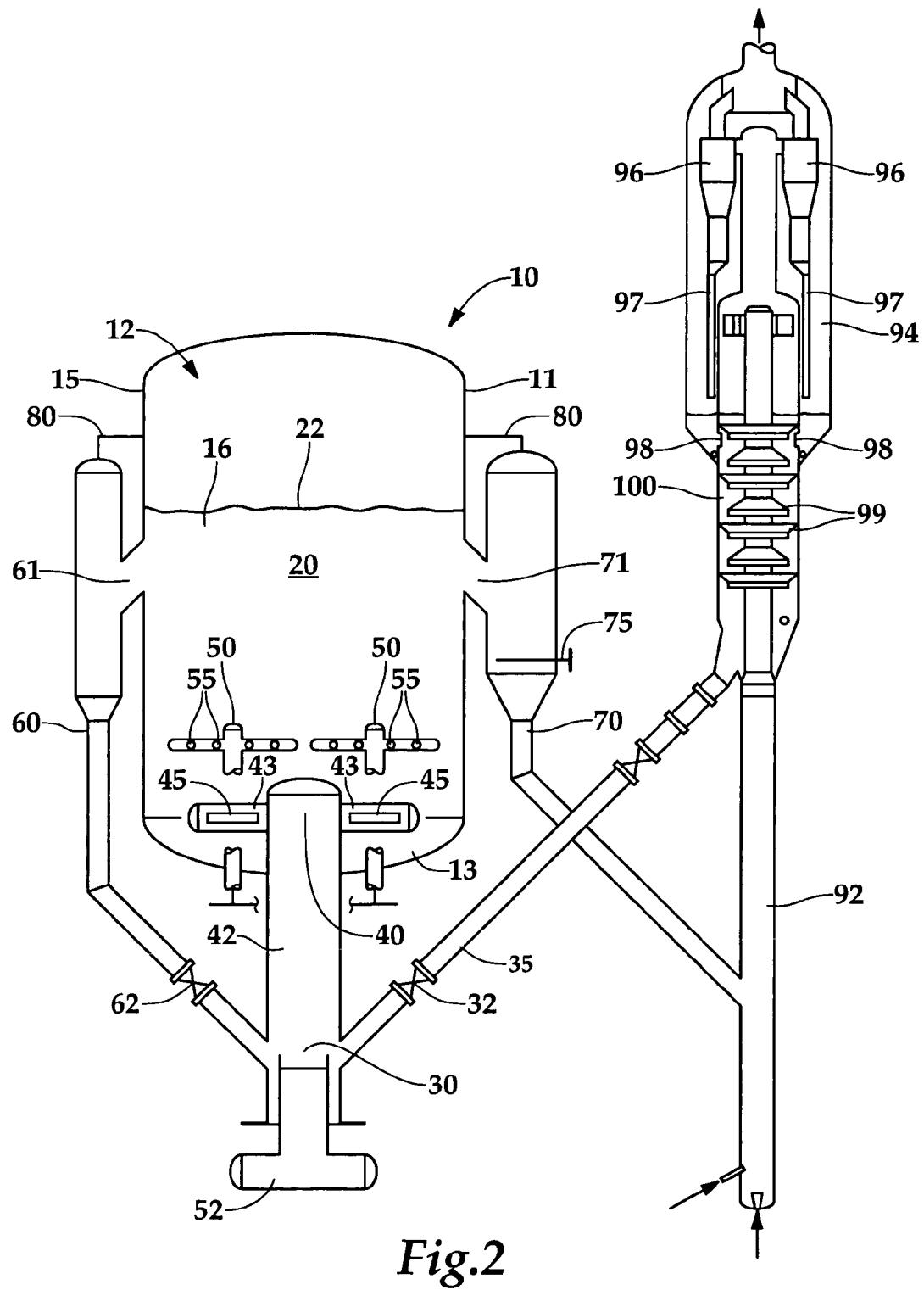
FIG. 2 is a cross-sectional elevation view of a revamped bubbling bed regenerator.

This invention is designed to provide an effective revamp of a bubbling bed style FCC regenerator by providing it with many features of a combustor style regenerator. The invention has the advantage of lowering NOx emissions while accomplishing complete CO combustion, with lower excess oxygen and the reduction or elimination of the need for CO combustion promoter. Since the use of platinum-based CO combustion promoter is linked to higher NOx emissions, this represents both an additive cost savings and a lower NOx emission. Likewise, a decrease in the excess oxygen required to complete combustion is linked to lower NOx emissions. Reducing the excess oxygen will result in lower NOx and reduce gas blower load. The design modifications provide better mixing and contact and therefore improve combustion efficiency without the need for excess oxygen or platinum-based CO promoter. The invention also may achieve a low entry point for the catalyst and some additional residence time for reduction reactions to take place in existing bubbling bed regenerators.

The invention provides the benefits of a combustor style regenerator to the bubbling bed regenerator. FIG. 1 shows the results of survey data for the combustor style as a superior low NOx regenerator to the bubbling bed style. According to FIG. 1, combustor style regenerators produce less NOx in the presence of excess oxygen than do bubbling bed regenerators.

Use of catalyst recirculation in the combustor style regenerator provides a higher mass flux and better contact between reactants as well as higher temperature. This will improve combustion efficiency by accelerating the burn and minimizing mass transfer limitations. Soft coke on the catalyst will volatize into a dense catalyst region, and any nitrogen compounds contained in the soft coke will oxidize to NOx. The dense catalyst region will afford ample surface for reduction reactions to more readily occur, converting NOx to $N_2$. Alternatively, in a typical bubbling bed, the spent catalyst is introduced high in the bed. In such a scenario it is likely that the soft coke will volatize and oxidize in a more dilute environment. NOx formed in this area of low catalyst density will have less chance for surface reduction reactions to occur. Therefore much of the NOx does not reduce to $N_2$ and leaves the regenerator as NOx. The invention utilizes the catalyst recirculation and creates a mixing zone of fast fluidization that will mimic the combustor operation. Draw off of regenerated catalyst from preferably opposing sides of the upper bed, provides for a more uniform flow and more complete combustion of the spent catalyst.

As shown in FIG. 2, a fluidized catalytic cracking (FCC) process of the present invention may include cracking hydrocarbon feed in a riser 92 with regenerated catalyst and forming a cracked product stream and spent catalyst, combining the regenerated catalyst and spent catalyst into a mixture in a mixing zone 30, transporting the mixture upwardly into a regenerator 10 containing a dense catalyst bed 20, regenerating the spent catalyst into regenerated catalyst in a dense bed 20, withdrawing the regenerated catalyst from near the top of the dense bed 20, returning a first portion of the regenerated catalyst into the riser 92, and recirculating a second portion of the regenerated catalyst to the mixing zone 30.

Continuing with FIG. 2, the spent catalyst may leave the riser 92 where the FCC reaction occurs and enter a disengaging zone 94 where cyclones 96 disengage the spent catalyst from the product vapors. Spent catalyst particles fall down dip legs 97 of the cyclones 96 and through windows 98 into a stripping zone 100 to contact stripping steam over baffles 99. The spent catalyst then falls downwardly over the baffles 99 and into a spent catalyst conduit 35 and enters the mixing zone 30. The temperature in the riser 92 may be between about 454° C. and about 593° C. (between about 850° F. and about 1100° F.), preferably between about 482° C. and about 566° C. (between about 900° F. and about 1050° F.), and more preferably between about 510° C. and about 538° C. (between about 950° F. and about 1000° F.).

Using this invention, a bubbling bed regenerator may be converted to incorporate many of the advantages of the combustor style regenerator. A mixing zone 30 below regenerator 10 may combine and mix combustion gas, spent catalyst, and recirculated regenerated (or fresh) catalyst. The combustion gas is a gas that contains oxygen, which is preferably air. The spent catalyst may be delivered to the mixing zone 30 from the separation zone 100 by the spent catalyst conduit 35 with a valve 32 to control the flow rate of the spent catalyst. The regenerated catalyst may be recirculated to the mixing zone 30 by a recirculation standpipe 60 with a valve 62 to control the flow rate of the regenerated catalyst. Respective outlets of the recirculation standpipe 60 and the spent catalyst conduit 35 fluidly communicate with the mixing zone 30. The mixing zone 30 may be centered on a vertical centerline of regenerator 10 and may be in fluid communication with a catalyst distributor 40 that terminates within the regenerator 10. Preferably, the catalyst distributor 40 comprises a riser 42 with the mixing zone 30 contained in the riser 42. Lift gas may be supplied by a lift gas distributor 52 at the base of the riser 42 to fluidize spent catalyst from the reactor and recirculated regenerated catalyst from recirculation standpipe 60 in the mixing zone 30. The lift gas is a gas that contains oxygen, which is preferably air. Preferably, the mixing zone 30 is provided at the base of the riser 42 at the confluence of the recirculation standpipe 60 and the spent catalyst conduit 35. The lift gas rate may be varied to be that portion of the total combustion gas required to lift the catalyst into regenerator 10 as a minimum, but can be varied beyond the minimum rate as deemed advantageous toward the goal of CO combustion and NOx reduction.

As shown in FIG. 2, converted regenerator 10 may have a cylindrical wall 11 with a hemispherical head at a top and a bottom 13 defining an interior chamber 12 wherein the dense bed 20 resides. The relative heights and volumes of the regenerator vessel 10 and the dense bed 20 are determined from the lowest point in the bottom 13 of the regenerator vessel 10. A catalyst distributor 40 and combustion gas distributors 50 penetrate the bottom 13 of regenerator 10. The catalyst distributor 40 receives catalyst and lift gas from the mixing zone 30 preferably through the riser 42. Lift gas such as air from the lift gas distributor 52 lifts the spent and regenerated catalyst from the mixing zone 30 up the riser 42. The catalyst distributor 40 has arms 43 with outlets 45 comprising slots disposed to disperse and fluidize the catalyst upwardly through the dense bed 20 to maximize residence time and more effectively regenerate the catalyst. The catalyst distributor arms 43 are preferably located at a top of the riser 42. The lift gas may be between about 5 wt-% and about 40 wt-%, preferably between about 10 wt-% and about 30 wt-%, and in one embodiment about 20 wt-% of the total combustion gas required. The superficial velocity of the lift gas in the riser 42 will be between about 3 and about 15 m/s (10 and 50 ft/s). The remaining gas, preferably air, added to complete the combustion will be introduced above a catalyst distributor 40 by combustion gas distributors 50. There may be between about 1 and about 4 combustion gas distributors 50, preferably about two combustion gas distributors 50. The gas will be distributed evenly across the dense bed 20 through outlets 55 comprising nozzles on the combustion gas distributors 50. The combustion gas distributors 50 may provide between about 60 wt-% and about 95 wt-% of the total combustion gas, preferably between about 70 wt-% and about 90 wt-%, and in one embodiment about 80 wt-%. Consequently, the majority of the combustion gas provided to the regenerator is through gas distributors 50 with outlets terminating in the regenerator vessel 10. The combustion gas from gas distributors 50 do not contact catalyst until it is released into the regenerator vessel 10. Whereas, lift gas from lift gas distributor 52 contacts catalyst in the mixing zone 30 outside of the regenerator vessel 10. The superficial velocity of the combustion gas in the regenerator vessel 10 from the gas distributors 50 will between about 0.6 and about 1.2 m/s (2 and 4 ft/s).

The dense bed 20 may be between about 3.3 m (about 10 ft) and about 6.6 m (about 20 ft) in height. The bed density may be between about 400 kg/m$^3$ (about 25 lb/ft$^3$) and about 641 kg/m$^3$ (about 40 lb/ft$^3$), preferably about 513 kg/m$^3$ (about 32 lb/ft$^3$). The temperature within mixing zone 30 may be between about 582° C. (about 1080° F.) and about 665° C. (about 1230° F.), preferably about 621° C. (about 1150° F.). The combustion temperature within regenerator 10 may be between about 649° C. (about 1200° F.) and about 732° C. (about 1350° F.), preferably about 704° C. (about 1300° F.).

In one embodiment, regenerator 10 may have grids (not shown) proximate to, and above, combustion gas distributors 50 to prevent gas pockets from forming within the dense bed 20.

As shown in FIG. 2, regenerated catalyst may be drawn off an upper portion 16 that is near the top 22 of the dense bed 20 preferably at two points opposite each other. A recirculation standpipe 60 and a return standpipe 70 fluidly communicate with and are attached to an upper half 15 of regenerator 10. The recirculation standpipe 60 and the return standpipe 70 may both be cylindrical pipes that are each fluidly communicably connected to the regenerator 10 and suspended vertically. The recirculating standpipe 60 may be flowably connected to the distributor 40 at a bottom half of the distributor 40

The regenerated catalyst to be recirculated back to the mixing zone 30 may be withdrawn through the recirculation standpipe 60 through an outlet 61, and the regenerated catalyst to be returned to the riser 92 may be withdrawn through the return standpipe 70 through an outlet 71. Both the recirculation standpipe 60 and the return standpipe 70 may withdraw the regenerated catalyst from the upper portion 16 which is near the top 22 of the dense bed 20, and preferably within the top third of the dense bed 20 based on volume. The diameter of the return standpipe 70 may be smaller than the diameter of the recirculation standpipe 60. The recirculation standpipe 60 and the return standpipe 70 may have buffer heads that extend above respective outlets 61 and 71. Lines 80 in fluid communication with the buffer heads of the standpipes 60 and 70 may equalize pressure and allow gas build up to escape back to the dilute phase of the regenerator 10.

The flow rates of the spent catalyst from the reactor and the return catalyst back to the reactor may be substantially equal. The flow rate of the recirculated catalyst may be controlled by the valve 62 on the recirculation standpipe 60. The regenerated catalyst being returned to the FCC riser 92 may be a first or return portion of the total regenerated catalyst. The regenerated catalyst being mixed with the spent catalyst and combustion gas in the mixing zone 30 may comprise a second or recirculated portion of the total regenerated fresh catalyst. The first portion may be smaller than the second portion of regenerated catalyst in the regenerator 10. The second portion of regenerated catalyst may be between about 100 wt-% and about 300 wt-% greater than the portion, and preferably about 200 wt-% greater than the first portion of regenerated catalyst. Fluidizing gas may be supplied to the return standpipe 70 by a fluidizing distributor 75.

As shown in FIGS. 3-5, in one embodiment, a generally cylindrical regenerator 110 may have an internal recirculation standpipe 160 and an internal spent catalyst standpipe 170 in the regenerator vessel 110. The internal recirculation standpipe 160 may follow the contour of a wall 111 of the regenerator 110 and include an internal recirculation hopper 161 at the top and an internal sloped recirculation section 162 which leads to a recirculation vertical section 152, located toward the center of the regenerator 110. The internal spent catalyst standpipe 170 also may follow the contour of the wall 111 of the regenerator 110 and include an internal spent catalyst hopper 171 and an internal sloped spent catalyst section 172 which leads to a spent catalyst vertical section 150 located toward the center of the regenerator 110. The recirculation vertical section 152 and the spent catalyst vertical section 150 each are located along the exterior of a distributor riser 142. A return catalyst conduit 185 may be connected to the side of the lower portion of the regenerator 110 and leads to the bottom of the FCC riser 92.

As shown in FIG. 4, the internal recirculation standpipe 160 and the internal spent catalyst standpipe 170 each may be half round sections of pipe. In an alternative embodiment, the internal recirculation standpipe 160 and the internal spent catalyst standpipe 170 each may have substantially square cross sections because each may be made from square pipe sections. The spent catalyst hopper 171 may have a larger diameter than the connected spent catalyst standpipe 170. The recirculation hopper 161 may have a larger diameter than the connected recirculation standpipe 160. The spent catalyst hopper 171 and the recirculation hopper 161 may help funnel catalyst into the internal spent catalyst standpipe 170 and the internal recirculation standpipe 170, respectively.

As shown in FIG. 3, both the recirculation standpipe 160 and the return standpipe 170 may withdraw the regenerated catalyst from an upper portion 116 which is near a top 122 of the dense bed 120, and preferably within the top third of the dense bed 120 based on volume. The recirculated catalyst may be directed down the internal recirculation standpipe 160 before joining the lift air in a mixing zone 130. The spent catalyst may be withdrawn from the FCC stripping zone 100 by a spent catalyst conduit 135 and delivered into the spent catalyst hopper 171 of the internal spent catalyst standpipe 170. The spent catalyst may join the lift air in the mixing zone 130. The lift air, the recirculated catalyst and the spent catalyst may all be delivered upwardly through the distributor riser 142 and into the regenerator 110 by the distributor 140. An air distributor 145 delivers lift air into the mixing zone 130 where the spent catalyst delivered from the spent catalyst vertical portion 150 and the recirculated catalyst delivered from the recirculation vertical portion 152 are carried upwardly through the distributor riser 142 by the lift air.

As shown in the further alternative in FIG. 5, the spent catalyst and the recirculated catalyst may be combined with the lift air in the air distributor 145 and introduced into the mixing zone 130 as a mixture. Combining the lift air and the catalyst in the air distributor may eliminate any low density pockets within the catalyst and air mixture. The recirculation vertical portion 152 may lead to a second recirculation sloped portion 165 which may lead to a recirculated distributor freefall portion 166 which then connects to the air distributor 145 through a recirculated air distributor connector 167. The spent catalyst vertical portion 150 may lead to a second spent catalyst sloped portion 155 which may lead to a spent catalyst freefall portion 156 which then connects to the air distributor 145 through a spent catalyst air distributor connector 157. The embodiment shown in FIG. 5 may introduce the spent catalyst and the recirculated catalyst laterally to a lift air stream. The embodiment shown in FIG. 3 may introduce the spent catalyst and the recirculated catalyst to the top of a lift air stream. In the embodiment of FIG. 5, the mixing zone 130 descends into air distributor 145.

As shown in FIGS. 3 and 4, the regenerator 110 has a return catalyst hopper 181 on top of and flowably connected to an internal return standpipe 180 which leads to the return catalyst conduit 185. A conical bottom 114 of the regenerator 110 helps funnel the catalyst in internal standpipes 162 and 172 to the centrally located distributor riser 142 located below the regenerator 110. Recirculation hopper 161 may be diametrically across the cylindrical regenerator 110 from the spent catalyst hopper 171 because the withdrawal of catalyst from opposite positions on the bottom 116 of the dense bed 120 allows for a more balanced withdrawal to both standpipes. The return standpipe 180 may be positioned far from the recirculation standpipe 160 and close to the spent catalyst standpipe 170.

The regenerator 10 and the regenerator 110 may both allow bubbling bed regenerators to incorporate many of the advantages of the combustor style regenerators in a time and cost efficient way. Since many possible embodiments may be made of the invention without departing from the scope thereof, it is understood that all matter herein set forth or shown in the accompanying drawings is to be interpreted as illustrative, and not in a limiting sense.

What is claimed is:

1. A fluidized catalytic cracking process, comprising:
   cracking hydrocarbon feed in a riser with regenerated catalyst to form cracked stream and spent catalyst;
   combining said regenerated catalyst, and said spent catalyst into a mixture in a mixing zone;
   adding lift gas to the mixing zone;
   transporting said mixture upwardly into a regenerator vessel having a dense bed;
   adding combustion gas to the regenerator vessel, said combustion gas being the majority of the gas added to the process;
   regenerating said spent catalyst into said regenerated catalyst in said dense bed;
   withdrawing regenerated catalyst from near a top half of said dense bed;
   returning a first portion of said regenerated catalyst into said riser; and
   recirculating a second portion of said regenerated catalyst to said mixing zone.

2. The process according to claim 1, wherein said combining step comprises mixing said combustion gas, said regenerated catalyst, and said spent catalyst in a distributor below said regenerator vessel.

3. The process according to claim 1, wherein said withdrawing step comprises withdrawing regenerated catalyst from a top third of said dense bed.

4. The process according to claim 1, wherein said returning step further comprises fluidizing said first portion.

5. The process according to claim 1, wherein said first portion is smaller than said second portion.

6. The process according to claim 5, wherein said second portion is between 100 wt-% and about 300 wt-% greater than said first portion.

7. The process according to claim 1, wherein said transporting step comprises adding lift gas into a distributor.

8. The process according to claim 7, wherein said regenerating step comprises adding combustion gas to said dense bed.

9. The process according to claim 8, wherein said lift gas comprises between about 10 wt-% and about 30 wt-% of said combustion gas.

10. An apparatus for regenerating cracking catalyst, comprising:
    a regenerator vessel having a bottom and a side, wherein said side has an upper half;
    a distributor penetrating through said bottom;
    a spent catalyst conduit flowably connected to said distributor;

a return standpipe flowably connected to said upper half; and a recirculating standpipe flowably connected between a bottom of said upper half and said distributor.

11. The apparatus according to claim 10, further comprising combustion gas distributors penetrating said bottom, said combustion gas distributors having combustion gas inlets.

12. The apparatus according to claim 11, wherein said distributor has a distributor inlet and said combustion gas inlets are located higher than said distributor inlet.

13. The apparatus according to claim 10, wherein said return standpipe further comprises a fluidizing gas source.

14. The apparatus according to claim 10, wherein said distributor further comprises a lift gas inlet.

15. The apparatus according to claim 10, wherein said return standpipe and said recirculating standpipe each have a diameter, and wherein said return standpipe diameter is greater than said recirculating standpipe diameter.

16. An apparatus for regenerating cracking catalyst, comprising:
  a regenerator vessel having a bottom and a side and a dense bed of catalyst in said vessel;
  a distributor penetrating through said bottom and in fluid communication with said regenerator vessel;
  a spent catalyst conduit with an outlet in fluid communication with said distributor;
  a return standpipe with an inlet in fluid communication with said regenerator vessel in the top third of said dense bed of catalyst; and
  a recirculating standpipe with an outlet in fluid communication with said distributor.

17. The apparatus according to claim 16, further comprising combustion gas distributors penetrating said bottom, said combustion gas distributors having combustion gas inlets.

18. The apparatus according to claim 17, wherein said distributor has a distributor inlet and said combustion gas inlets are located higher than said distributor inlet.

19. The apparatus according to claim 16, wherein said distributor further comprises a lift gas inlet.

20. The apparatus according to claim 16, wherein said return standpipe and said recirculating standpipe each have a diameter, and wherein said return standpipe diameter is greater than said recirculating standpipe diameter.

21. An apparatus for regenerating cracking catalyst, comprising:
  a generally cylindrical regenerator vessel having a lower portion, with an inner side, a bottom and a dense bed of catalyst contained therein;
  a distributor penetrating through said bottom and in fluid communication with said regenerator vessel;
  a spent catalyst standpipe positioned on said inner side and in fluid communication with said distributor;
  a recirculation standpipe positioned on said inner side and in fluid communication with said distributor;
  a spent catalyst conduit in fluid communication with said regenerator vessel; and
  a return catalyst conduit penetrating said lower portion and in fluid communication with said regenerator vessel.

22. The apparatus for regenerating cracking catalyst according to claim 21, further comprising a spent catalyst hopper in fluid communication with said spent catalyst standpipe, wherein said spent catalyst conduit is in fluid communication with said spent catalyst hopper.

23. The apparatus for regenerating cracking catalyst according to claim 21, further comprising a recirculation hopper in fluid communication with said recirculation standpipe.

24. The apparatus for regenerating cracking catalyst according to claim 21, further comprising a return catalyst hopper in fluid communication with said return catalyst conduit.

25. The apparatus for regenerating cracking catalyst according to claim 21, wherein said spent catalyst hopper is positioned in a first location and said recirculation hopper is positioned in a second location, and wherein said first location and said second location are diametrically opposite in said regenerator vessel.

26. The apparatus for regenerating cracking catalyst according to claim 21, further comprising an air distributor below and in fluid communication with said distributor.

* * * * *